United States Patent [19]

Hayashi

[11] Patent Number: 4,722,013
[45] Date of Patent: Jan. 26, 1988

[54] LOCK MECHANISM FOR LOCKING A HEAD PLATE AND FAST-FORWARDING AND REWINDING LEVERS

[75] Inventor: Hideki Hayashi, Tokyo, Japan
[73] Assignee: Clarion Co., Ltd., Tokyo, Japan
[21] Appl. No.: 848,883
[22] Filed: Apr. 7, 1986
[30] Foreign Application Priority Data Apr. 5, 1985 [JP] Japan .................................. 60-72266

[51] Int. Cl.⁴ .............................................. G11B 5/54
[52] U.S. Cl. .................................................. 360/105
[58] Field of Search ................... 360/72.1, 74.4, 105; 242/197-200

[56] References Cited

U.S. PATENT DOCUMENTS 4,380,031  4/1983  d'Arc ................................. 360/72.1
4,425,595  1/1984  Watanabe ..................... 360/72.1 X
4,519,269  5/1985  Itoh .
4,581,666  4/1986  Itoh .

Primary Examiner—A. J. Heinz
Attorney, Agent, or Firm—Flynn, Thiel, Boutell & Tanis

[57] ABSTRACT

A lock mechanism for locking a head plate and fast-forwarding and rewinding levers of a tape player comprises step-shaped engage portions formed along side margins of the fast-forwarding and rewinding levers near their one end, a lever lock member pivotally mounted near these ends of the levers for releasable locking engagement with the step-shaped engage portions, and a compression portion formed along a margin of the head plate which unlocks the locking engagement between the lever lock member and step-shaped engage portion when the head plate withdraws concurrently with deenergization of a plunger upon detection of a non-signal portion between pieces of music on a tape.

6 Claims, 4 Drawing Figures

LOCK MECHANISM FOR LOCKING A HEAD PLATE AND FAST-FORWARDING AND REWINDING LEVERS

FIELD OF THE INVENTION

This invention relates to a lock mechanism for locking a head plate and fast-forwarding and rewinding operational levers in a tape player having a head movable to and away from a tape.

BACKGROUND OF THE INVENTION

An inter-music detection mechanism for detecting a non-signal portion between pieces of music on a tape to select a desired piece of music is activated in the fastforwarding (FF) or rewinding (REW) mode of the tape player where a tape slightly contacts a head and is driven at a high speed. When the head detects a non-signal portion on the tape, a plunger which has heretofore maintained the FF or REW mode is deenergized to allow the head to get in close contact with the tape, and the FF or REW lever is withdrawn to detach a high speed idler from a reel base.

One of several recent tape players includes a motor-driven head plate which supports a head and is moved upon a mode change from the stop mode to the play mode to bring the head to a predetermined position. In this type of tape player, a specific plunger is used to hold the head plate at its advance position when energized and to unlock the head plate when deenergized upon restoration of the stop mode.

However, the prior art lock mechanism using a specific plunger for locking a head plate, when combined with the aforegoing inter-music detection mechanism, require several plungers specifically provided to individual mechanisms, and invites a complicated circuit or switching arrangement for control of the plungers. Additionally, since these plungers are more expensive than other sheet metal members, they inevitably increase the manufacturing cost of the tape player.

OBJECT OF THE INVENTION

It is therefore an object of the invention to provide a lock mechanism for locking a head plate and FF/REW levers which uses a single plunger not only for locking the head plate at its advance position but also for maintaining the FF or REW lever during inter-music detection, thereby simplifying the construction and reducing the manufacturing cost of the tape player.

SUMMARY OF THE INVENTION

According to the present invention, there is provided a head plate and fast-forwarding/rewinding lever lock mechanism in a tape player comprising:

a head plate carrying a head thereon to bring the head to and away from a tape in the tape player;

a plunger energized to hold the head plate at its advance position and temporarily deenergized in response to a signal from the head when the head detects a non-signal portion between pieces of music on the tape;

a lock member for locking a fast-forwarding or rewinding operational lever and unlocking same when the lock member is pushed and rotated by the head plate being moved to its withdrawal position;

a spring biasing said lever lock member in a direction for locking engagement with said fast-forwarding or rewinding operational lever; and an engagement portion provided on said fastforwarding or rewinding operational lever to engage said lever lock member when said lever is pushed into the tape player.

BRIEF DESCRIPTION OF THE DRAWINGS

FIGS. 1 through 3 illustrate a head plate and FF/REW lever lock mechanism embodying the invention, in which FIGS. 1 is a plan view of the mechanism in the play mode, FIG. 2 is a plan view of the mechanism during inter-music detection, and FIG. 3 is a plan view of the mechanism on restoration of the stop mode.

DETAILED DESCRIPTION

Figure 1:
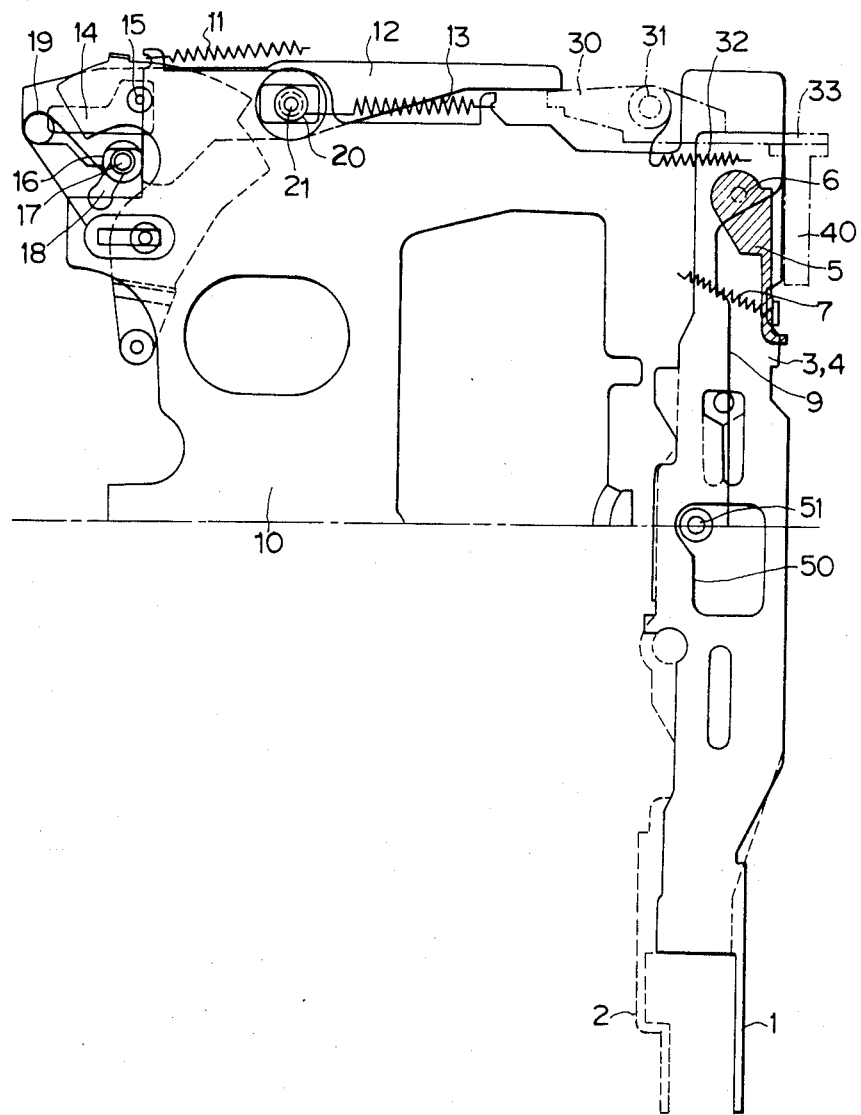

The invention is hereinbelow described in detail, referring to a preferred embodiment illustrated in the drawings.

Figure 2:
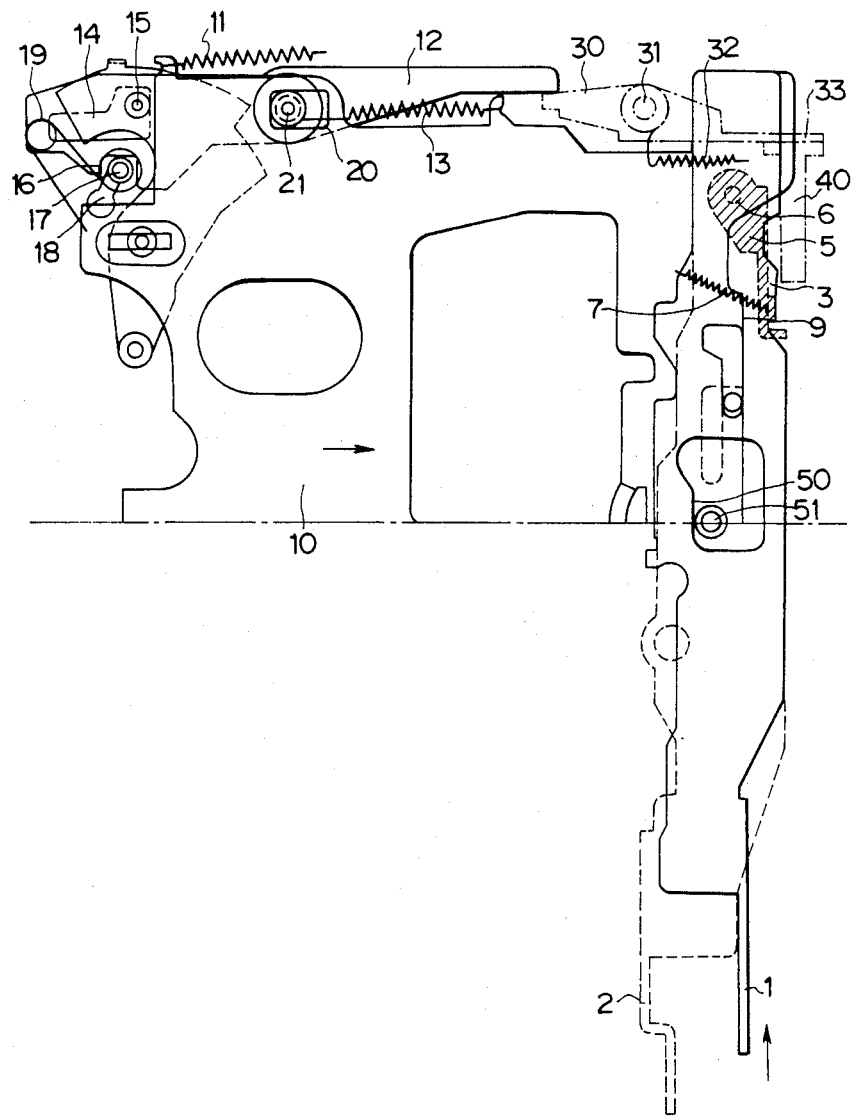
Figure 3:
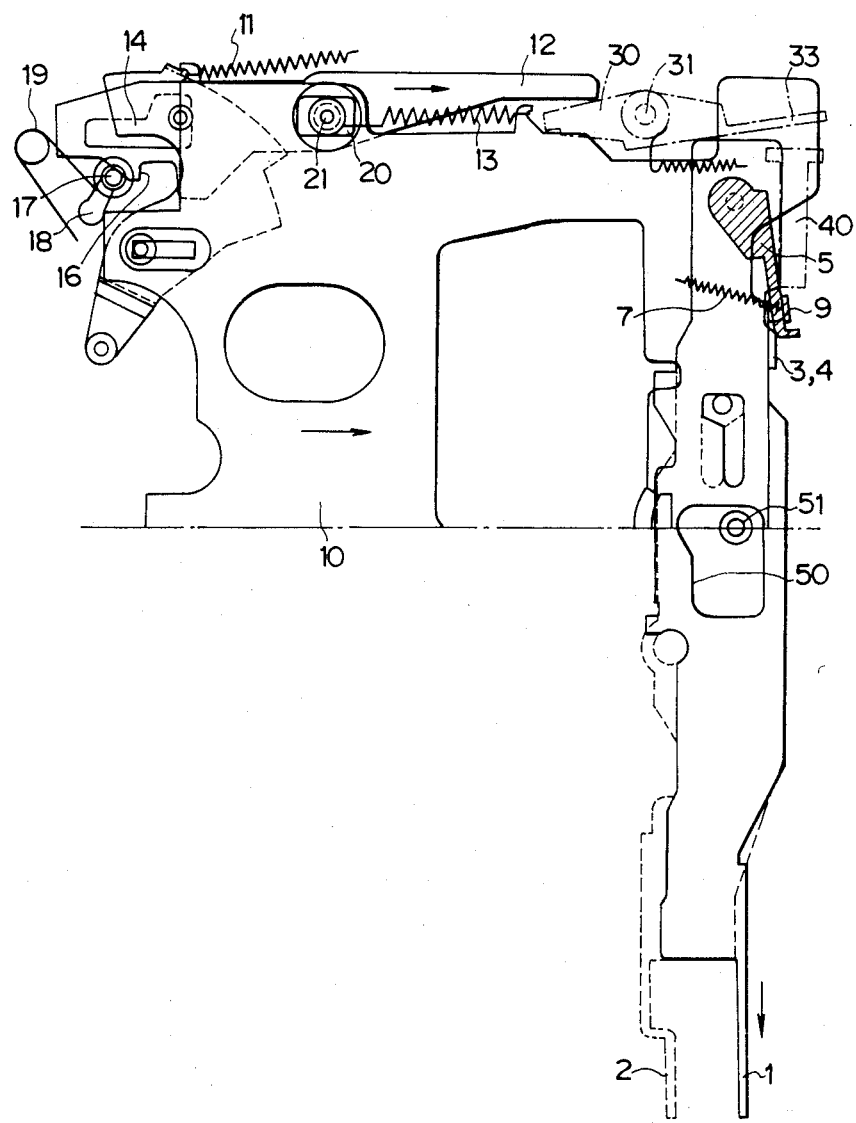
Figure 4:
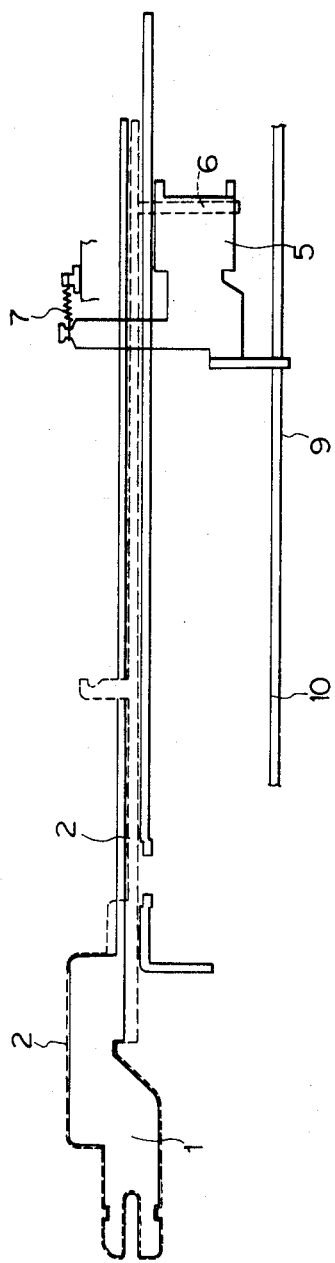
FIG. 4 is a side elevation of a lever lock member and other components of the embodiment of FIG. 1.

As shown in FIG. 1, an FF (fast-forward) lever 1 and a RE (rewind) lever 2 are mounted movably back and forth with respect to a tape player, and they are normally biased by a not illustrated revival spring outward of the tape player (downward in FIGS. 1 through 3). Each lever has near the inner portion thereof a step-shaped engage portion 3 or 4 for engagement with a lock member 5 when inserted deep into the tape player. The lock member 5 is mounted near the inner ends of the FF and REW levers 1, 2 pivotably about an axis 6 for engagement with the engage portions 3, 4. The lock member 5 is biased by a spring 7 connecting it to a chassis of the tape player in a direction to bring the lock portion at the distal end thereof into engagement with the engage portions 3. 4.

A head plate 10 is supported on the chassis for movement reciprocally in a direction perpendicular to the movement direction of the levers 1, 2, and is normally biased by a withdrawal spring 11 in a withdrawal (right in FIGS. 1-3) direction. The right end margin of the head plate 10 defines a push portion 9 which pushes the lever lock member 5 against the energy of the spring 7 when the head plate 10 withdraws.

The head plate 10 is resiliently connected to a shift plate 12 by a spring 13. The shift plate 12 has an engage hole 14 which movably receives a pull member 15 of a power plate so that the shift plate 12 together with the head plate 10 is pulled ahead (leftward in FIGS. 1-3) by the pull member 15 which is moved ahead by an intermittent cam which is not illustrated as is rotated merely on advance movement of the head plate. The shift plate 12 has at the left end thereof a tapered engage portion 16 engageable with a lock member 17 when the shift plate 12 is moved ahead (to the left in the drawings). The lock member 17 is movably inserted in a guide hole 18 formed in the chassis of the tape player, and is normally biased by a spring 19 in a direction for engagement with the shift plate 12.

The shift plate 12 is pivotably connected to the head plate 10 by engagement between an axle 21 and an elongated hole 20. A release link 30 for preventing rotation of the shift plate 12 is provided near the right end of the shift plate 12 pivotably about an axle 31, and is biased by a withdrawal spring 32 which has a smaller energy than the spring 11 so that one end of the release link 30 contacts the opposed margin of the shift plate 12. A second end 33 of the release link 30 opposite to the first end is releasably attracted by a lock plunger 40 to lockingly maintain the first end in slidable contact with the shift plate 12.

The lock plunger 40 is controlled by a control circuit not shown so that it is basically kept energized after a play mode instruction is entered but is temporarily de-energized in the inter-music detection mode when the head detects a non-signal portion between pieces of music on a tape.

As shown in FIG. 1, when a play-mode instruction is entered in the tape player, the plunger 40 is energized by activation of the motor, and attractively pulls the second end 33 of the release link 40. This attraction is facilitated by the clockwise biasing force of the spring 32. When the release link 30 is locked by the plunger 40, the first end of the link 30 prevents the shift plate 12 from rotation, so that the shift plate 12 pulled by the pull member 14 in the engage hole 15 simply moves linearly, slidably contacting the first end of the release link 30. The pull member 15 of the power plate is moved ahead linearly by the intermittent cam which is rotated when and after the motor starts rotating. The head plate 10 connected to the shift plate 12 is moved ahead together with same, and when it reaches its advance position, the lock member 17 of the chassis enters in the tapered engage portion 16 of the shift plate 12 with the energy of the spring 19. Therefore, the shift plate 12 and head plate 10 are locked there, and the play mode is established. The engage member 16, although tapered, never disengages from the lock member 17 so long as the shift plate 12 is prevented from rotation by the release link 30.

Referring to FIG. 2, when the FF or REW lever 1 or 2 is manually compressed in the play mode for inter-music detection, the pushed lever 1 or 2 is locked there by locking engagement between the engage portion 3 or 4 and the lock member 5 biased by the spring 7, and the FF or REW mode is established. At that time, a control portion 50 formed in the FF or REW lever is configured to compress an engage pin 51 formed on the head plate 10, the head plate 10 is forcibly pulled back to a position where the head slightly contacts a tape. The relative displacement produced thereby between the head plate 10 and the shift plate 12 is resiliently absorbed or adjusted by the spring 13.

When the head detects a non-signal portion between pieces of music on the tape, the plunger 40 is deenergized, and unlocks the release link 30. Therefore, the shift plate 12 loses the energy from the release link 30 and is allowed to rotate about the axle 21. As the result, the shift plate 12 which receives a withdrawal force from the head plate withdrawal spring 11 is rotated counterclockwise due to a moment produced at the tapered engage portion 16. Therefore, the shift plate 12 is unlocked from the lock member 17 and allowed to withdraw together with the head plate 10.

Referring to FIG. 3, when the head plate 10 withdraws, the push portion 9 at the right end thereof pushes the lock member 5 against the spring 7 to release the urging of engage portion 3 or 4 of the lever 1 or 2 from the lever lock member 5, and the lever 1 or 2 is allowed to return to its original position with the energy of the revival spring therefor.

After the lever 1 or 2 is released, the plunger 40 is energized again, and the mechanism takes the same configuration as on the aforegoing play-mode instruction. Therefore, the shift plate 12 and head plate 10 are allowed to advance similarly, and when the shift plate 12 is locked, the play mode is restored and maintained (see FIG. 1).

As described, the invention lock mechanism of a head plate and RR/REW levers uses a single plunger not only for locking the head plate at its advance position but also for locking the FF or REW lever at an inserted position. This arrangement reduces the number of plungers and control circuits or switches therefor, and contributes to a simplified construction of the tape player and a cost reduction of the lock mechanism.

The embodiment of the invention in which an exclusive property or privilege is claimed is defined as follows:

1. A tape player which is adapted to play a tape having thereon plural musical selections separated by non-signal portions, comprising:

a head plate supported for movement between a withdrawal position and an advance position, and having a head thereon which is respectively engaging and spaced from a tape when said head plate is respectively in said advance and withdrawal positions;

shift means for effecting movement of said head plate from said withdrawal position to said advance position;

a manually actuable lever which is supported for movement between first and second positions and can be manually moved from said first position to said second position, wherein when said head plate is in said advance position and said lever is moved to said second position, a tape engaging said head is moved therepast at a high speed;

a selectively energizeable plunger and means responsive to energization of said plunger for causing said shift means to releasably hold said head plate against movement to said withdrawal position from said advance position in which said head plate is spaced from said withdrawal position and in which said head contacts a tape, and wherein said plunger is temporarily de-energized when said head plate is in said advance position and said lever is in said second position and in response to a signal produced by said head when said head detects a non-signal portion between two selections of music on a tape, said means responsive to said plunger causing said shift means to release said head plate in response to said de-energization of said plunger so as to permit movement of said head plate back to its withdrawal position;

an engagement portion provided on said lever;

a lock member supported for movement between locking and release positions in which it respectively engages and is spaced from said engagement portion of said lever when said lever is in said second position, wherein when said lock member is engaging said engagement portion of said lever said lock member prevents movement of said lever from its second to its first position;

a spring biasing said lock member toward its locking position; and an unlocking portion which is provided on said head plate and which engages said lock member and moves said lock member away from its locking position as said head plate moves to its withdrawal position following said temporary de-energizing of said plunger, whereby said lock member becomes disengaged from said engagement portion of said lever to thereby permit movement of said lever from its second position to its first position.

2. A tape player, comprising:

a head plate supported for movement between a withdrawal position and an advance position and having thereon an unlocking portion;

resilient means for yieldably urging said head plate toward said withdrawal position;

shift means for effecting movement of said head plate away from said withdrawal position toward said advance position against the urging of said resilient means;

a selectively energizeable plunger which, when energized, is temporarily de-energized in response to the occurrence of a predetermined condition;

means responsove to energization of said plunger when said head plate is spaced from said withdrawal position for preventing said head plate from being moved to said withdrawal position by said resilient means so long as said plunger is energized;

a manually actuable lever supported for movement between first and second positions, and having thereon an engagement portion;

a lock member supported for movement between locking and release positions, wherein when said lever is in said second position said lock member respectively engages and is spaced from said engagement portion of said lever when said lock member is respectively in said locking and release positions, and wherein when said lock member is engaging said engagement portion of said lever said lock member prevents movement of said lever from its second position to its first position; and biasing means yieldably urging said lock member toward its locking position;

wherein said plunger responsive means responds to said temporary de-energization of said plunger by permitting said head plate to be moved to said withdrawal position by said resilient means, and wherein as said head plate is moved by said resilient means to said withdrawal position said unlocking portion thereof engages said lock member and moves said lock member from said locking position to said release position.

3. The tape player of claim 2, wherein said lock member is supported for pivotal movement between said locking and release positions, and wherein said biasing means includes a spring which urges pivotal movement of said lock member.

4. The tape player of claim 2, wherein said shift means includes a shift member moveable from a withdrawal position to an advance position in an advance direction which is substantially parallel to the direction in which said head plate moves from its withdrawal position to its advance position, and includes a withdrawal spring which is operatively coupled to said shift member and said head plate and urges said shift member to move in a direction opposite said advance direction relative to said head plate.

5. The tape player of claim 4, wherein said plunger responsive means includes said shift member being supported for pivotal movement between first and second pivotal positions relative to said head plate about an axis extending substantially perpendicular to said advance direction, and includes a release link supported for pivotal movement between locking and unlocking positions and having a portion which moves toward said plunger as said release link moves from its unlocking to its locking position, said plunger attracting said portion of said release link when energized in order to releasably hold said release link in said locking position, said release link engaging said shift member and preventing pivotal movement of said shift plate away from its first pivotal position when said release link is in said locking position, said release link permitting pivotal movement of said shift member from its first pivotal position to its second pivotal position when said release link is in its unlocking position; and wherein said plunger responsive means further includes said shift member having an engagement portion, includes a further lock member supported for movement between positions engaging and spaced from said engage portion of said shift member when said shift member is in its advance position and its first pivotal position; wherein when said release link is held in its locking position by said plunger and said further lock member is engaging said engage portion of said shift member said shift member is held in its advance position; wherein pivotal movement of said shift member from its first pivotal position to its second pivotal position when said shift member is in its advance position effects disengagement of said engage portion of said shift member from said further lock member; and including a spring which yieldably urges said further lock member toward said position in which it is engageable with said engage portion of said shift plate.

6. The tape player of claim 4, including an engage pin which is provided on said head plate and a control portion which is provided on said lever and can engage said engage pin, wherein when said lever is moved from its first position to its second position while said head plate is in its advance position, said control portion on said lever causes said engage pin to move said head plate to a position between said advance and withdrawal positions thereof.

* * * * *